United States Patent [19]

Leupold et al.

[11] Patent Number: 4,467,396
[45] Date of Patent: Aug. 21, 1984

[54] MONOLITHIC CAPACITOR AND METHOD OF MANUFACTURING IT

[75] Inventors: Gerhard Leupold; Hans Hoppert, both of Selb, Fed. Rep. of Germany

[73] Assignee: Draloric Electronic GmbH, Fed. Rep. of Germany

[21] Appl. No.: 477,411

[22] Filed: Mar. 21, 1983

[30] Foreign Application Priority Data

Mar. 19, 1982 [DE] Fed. Rep. of Germany ....... 3210016
Mar. 2, 1983 [DE] Fed. Rep. of Germany ....... 3307231

[51] Int. Cl.³ .................... H01G 4/12; C04B 35/46
[52] U.S. Cl. .................... 361/321; 29/25.42
[58] Field of Search .................... 361/321; 29/25.42

[56] References Cited

U.S. PATENT DOCUMENTS

| | | | |
|---|---|---|---|
| 3,299,332 | 1/1967 | Saburi | 29/25.42 X |
| 4,030,004 | 6/1977 | Rutt | 361/321 X |
| 4,071,880 | 1/1978 | Rutt | 361/321 X |
| 4,266,265 | 5/1981 | Maher | 361/321 |

Primary Examiner—Donald A. Griffin
Attorney, Agent, or Firm—Ostrolenk, Faber, Gerb & Soffen

[57] ABSTRACT

The present invention relates to a monolithic capacitor of an insulating body of densely sintered ceramic material having electrically conductive layers interleaved parallel to and spaced from each other, extending alternately to one of two opposite outer surfaces of the insulating body where they are connected together by metal connecting layers to form the two plates of the capacitor. In order to obtain a very high capacitance per unit of volume, the insulating body is a semiconductive strontium titanate ceramic with grain-boundary barrier layers. In view of the fact that, in the case of such a ceramic, noble metals would diffuse into the grain-boundary barrier layer and reduce the insulation resistance, the electrically conductive layers of non-noble metals or metal alloys are injected into open-pore hollow spaces which form a network.

11 Claims, 3 Drawing Figures

MONOLITHIC CAPACITOR AND METHOD OF MANUFACTURING IT

The present invention relates to a monolithic capacitor of the type which is an insulation body of a densely sintered dielectric ceramic material having electrically conductive layers interleaved parallel to and spaced from each other and to a method of manufacturing it.

Ceramic capacitors have been used for many years and as a result of the high dielectric constants of ceramic materials, for instance barium titanate, have replaced the previously customary capacitors of paper, mica and other materials. These ceramic capacitors have a very high capacitance per unit of volume so that they have a high total capacitance for a small size.

A capacitor of the above-mentioned type as well as a method of manufacturing it are known from West German Pat. No. 22 18 170. In it, barium titanate, titanium dioxide, barium strontium titanate and the like are used as ceramic materials for the insulating body. These ceramic materials have dielectric constants which extend up to an order of magnitude of 12,000. Their temperature coefficient in the range between $-25°$ C. and $+85°$ C. is of the order of magnitude of $+20\%$ to $-80\%$.

It is also known to produce ceramic dielectrics of high effective dielectric constant by insulating the grain boundaries of conventional semiconductor ceramics. Structures of this kind are known as "grain-boundary barrier-layer capacitors." By these measures, barium-titanate semiconductor ceramics having an effective dielectric constant of between 50,000 and 70,000 can, for instance, be obtained. The dielectric breakdown strength of such ceramics is 800 V/mm. The electrical resistivity of such ceramics is about $2+10^{11}$ ohm.cm. The great disadvantage in practical use of such capacitors is that, within the temperature range of between 30° C. and 85° C., there are changes in capacitance of $\pm 40\%$ as compared with the corresponding values at room temperature. The loss factor of the known ceramics is furthermore comparatively high, namely about 5% to 10%, so that the ceramics described are not very advantageous from this standpoint either.

Strontium titanate is, in itself, known as principal component for capacitors. It is mixed in combination with manganese oxide and silicon dioxide, compacted, and sintered under argon. The shaped body obtained can be subjected, with or without additional coating with manganese oxide, to a second sintering in an oxidizing atmosphere. In this way, boundary-grain insulation is produced. The change in electrostatic capacitance between 30° C. and 85° C. of such a product is about $\pm 15\%$. The loss factor is 0.2% to 5%. The strontium-titanate ceramic is therefore clearly superior to the corresponding barium-titanate ceramic in this respect. It is, however, definitely inferior to the barium-titanate ceramic inasmuch as its effective dielectric constant, with a breakdown voltage of 800 V/mm to 1000 V/mm, reaches the relatively low value of 20,000 to 35,000.

From West German Provisional Pat. No. 24 33 661, a semiconductor ceramic having a base of strontium titanate with intergrain insulation of improved properties is known which is pressed into disks, coated on its two main surfaces with powdered bismuth oxide, and then sintered in an oxidizing atmosphere. In this way, the bismuth oxide applied as coating diffuses along the grain boundaries into the inside of the disk-shaped body. An intergrain insulation is produced. By applying and burning-in silver electrodes on the ceramic produced in this manner, there are obtained disk capacitors whose capacitance per unit of volume is relatively low, despit a high dielectric constant, since the capacitance of such disk capacitors is inversely proportional to their thickness.

From "The American Cermic Society Inc.: Advances in Ceramics", edited by L. Levinson and D. Holl, pages 223 and 224, there are known monolithic boundary-grain barrier-layer capacitors in which, however, noble metals are proposed as metal layers between the dielectric layers. As furthermore stated there, these noble metals, however, react with the boundary-grain barrier layers, i.e. they diffuse into them, as a result of which the insulation resistance is negatively affected.

Therefore the object of the present invention is to make available a monolithic capacitor of high capacitance per unit of volume which combines the advantages of a monolithic capacitor in which the electrically conductive layers consist of layers, interposed between the dielectric-forming material, of a porous ceramic material having a network of interconnected pores within which conductive material is contained, with a semiconductor ceramic of high relative dielectric constant and improved dielectric properties.

This object is achieved in accordance with the invention by providing an insulation body of a densely sintered dielectric ceramic material having electrically conductive layers interleaved parallel to and spaced from each layer, which layers are formed in hollow spaces provided in layer regions in the dielectric material into which electrically conductive material is incorporated, which layers extend alternatively up to one of two opposite outer faces of the insulating body where they are electrically combined by connections each forming one of the two plates of the capacitor, and the edge of which opposite outer face extends spaced in each case from the opposite outer surface of the ceramic body, the electrically conductive layers being layers interposed in the dielectric material and of a porous ceramic material having a network of interconnected pores within which the conductive material is located, the ceramic material of the insulating body being a known semiconductor ceramic having a base of strontium titanate with intergrain insulation. The strontium titanate can be doped with small quantities of niobium oxide and/or tantalum oxide and/or bismuth oxide and furthermore contain small amounts of mineralizers or additives for impeding the grain growth of the doped strontium titanate in such a manner that the grain size thereof is between 5 and 10 microns. The mineralizer or grain growth inhibitor can be zirconium, vanadium, chromium, phosphorus, silicon, germanium, aluminum, niobium, bismuth, molybdenum, tungsten, iron, copper, nickel, individually or in combination and the material of the insulating body and the interposed layers can have the same chemical composition. The conductive material can be a non-noble metal or alloy. The capacitor can be made by providing a plurality of thin self-supporting sheets of finely divided ceramic material which is bonded by a volatile binder and densely sintered upon firing at a sintering temperature, applying to such sheets layers of a second ceramic material which is bonded by a volatile binder and upon firing develops a network of interconnecting pores, the self-supporting body being fired in an oxidizing atmosphere to provide the network of intercommunicating pores, a firing is carried out in a reducing atmosphere to complete reduction of the insulating body, and an aqueous solution of a glass former which acts as a p-doping agent is injected into the open pore network under vacuum and the resulting insulating body is fired in an oxidizing atmosphere to produce the intergrain insulation.

The advantages obtained with the invention reside, in particular, in the fact that a monolithic capacitor is made available which consists of a ceramic material of very high dielectric constant of strontium titanate with intergrain insulation the particle size of which is of the order of magnitude of 5 μm, in which the thickness of the dielectric layers between the open-pore networks which are filled with electrically conductive material is of the order of magnitude of 20 μm, and that, as electrically conductive material, a cheap alloy, for instance of lead and tin, is used rather than an expensive noble metal which diffuses into the boundary-grain barrier layers and impairs the insulation resistance. Two known variants, namely a known method of manufacturing monolithic capacitors with a known material of high dielectric constant, are combined in order to be able to produce capacitors of high capacitance per unit of volume at a very low price in mass production.

One illustrative embodiment of the invention is shown diagrammatically in the drawing, in which.

Figure 1:
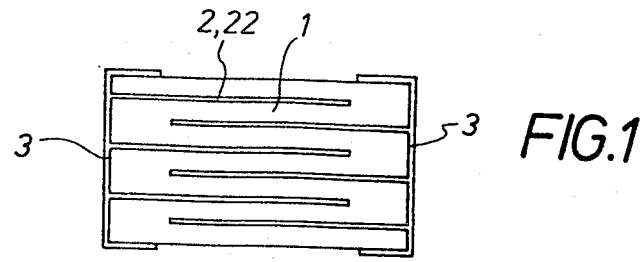
FIG. 1 is a cross-section through a monolithic capacitor, shown on an enlarged scale.

FIG. 1 shows a monolithic capacitor consisting of an insulating body of a densely sintered dielectric ceramic material 1 with electrically conductive layers 2 interleaved parallel to and spaced from each other which are formed by hollow spaces 22 in the dielectric material 1 which are provided in said layer regions and into which the electrically conductive material of the layers 2 is placed, said layers extending alternately to one of two opposite outer surfaces of the insulating body where they are combined by connecting metal layers 3 forming in each case one of the two plates of the capacitor.

Figure 2:
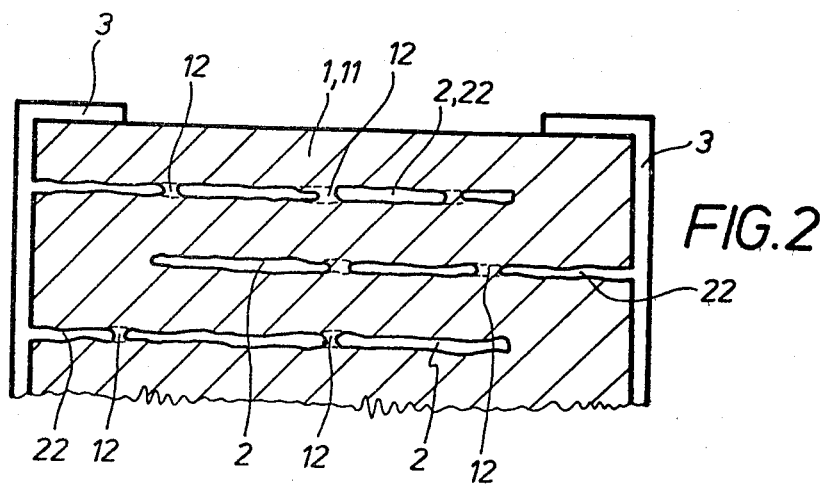
FIG. 2 is a portion from a monolithic capacitor, shown on a still larger scale.
Figure 3:
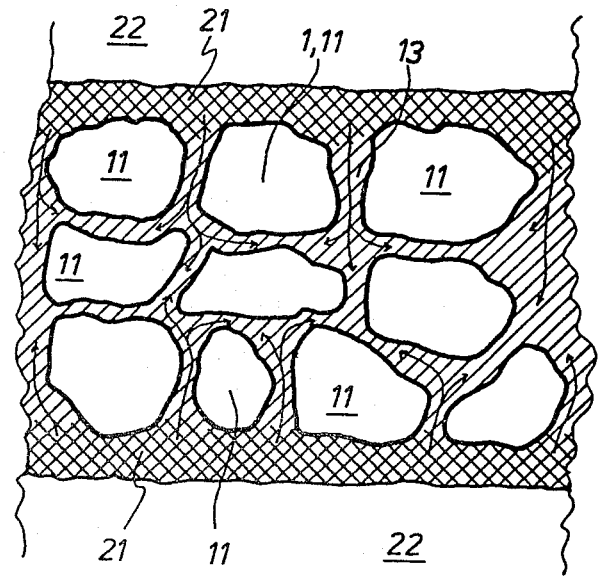
FIG. 3 is a greatly enlarged showing of a dielectric foil of a monolithic capacitor.

FIG. 2 shows, in an enlarged fragmentary view, densely sintered dielectric ceramic foils 1 which, in order to produce the hollow spaces, are printed on one side with a paste which consists, for instance, of strontium titanate in powder form which, on basis of a weight ratio of 1:1, is mixed with a binder consisting of pine oil, acrylic acid and a lecithin dispersant to which ethyl cellulose is added in order to increase the viscosity. In this connection, the particle size of the strontium titanate corresponds to that within the ceramic foils, i.e. it is of the order of magnitude of 5 μm. Such printed foils 1 are stacked in known manner so that the surfaces printed with paste are alternately staggered with respect to each other. The stacked blocks are slowly heated in air in order to expel and/or decompose the binder in the ceramic layers 11 and then sintered in air at temperatures between 1000° C. and 1300° C. in order to form the monolithic capacitor bodies. In this way, the paste is also decomposed or expelled so that hollow spaces 22 in the form of intercommunicating pores are produced between the densely sintered foils 11 of strontium titanate, the hollow spaces resting on bridges 22 of ceramic material. Thereupon a firing is effected in a reducing atmosphere of 95 to 98% nitrogen and 2 to 5% hydrogen, in which the monolithic capacitor body is completely reduced so as to obtain a body having a specific conductivity of 1 ohm.cm. A solution or suspension consisting of glass-formers such as bismuth oxide, lead-boron oxide, bismuth-lead-boron oxide and oxides of the metals copper, manganese, iron, nickel and cobalt is then injected under vacuum into the hollow spaces 22 and an oxidizing firing effected, while strictly maintaining a well-defined temperature profile, the layer 21 formed of the glass formers and the last-mentioned oxides—as shown in FIG. 3—diffusing thereby from the surface of each hollow space 22 between the grain 11 in the vitreous phase present there and forming on the surface of each n-conductive grain 11 a p-conductive grain-boundary barrier layer, in such a manner that an n-p-i-p-n transition is produced between two adjacent grains 11. The firing temperatures are betwen 650° C. and 1200° C. The firing parameters must be so maintained, by variation of the temperature, the time and the atmosphere, that only the grain boundaries are oxidized while the reduced inside of the grain remains conductive. In accordance with the invention, the grain diameters are about 5 μm. In this way there are obtained dielectric constants of 10,000 to 12,000, temperature dependencies of the dielectric constant between $-25°$ C. and $+85°$ C. of less than $\pm 15\%$, loss factors of less than 1%, and insulation resistances of more than $10^{10}$ ohms. Due to the thin possible wall thickness of the dielectric layers of 20 μm there is obtained, with a dielectric constant of 12,000, a capacitance-proportional quotient of 12,000:20=600 while the corresponding quotient in the case of a known strontium titanate-semiconductor ceramic having a grain size of 50 μm and a layer thickness of 200 μm with a dielectric constant of 60,000 is 60,000:200=300. This means that the capacitance per unit of volume of the capacitors in accordance with the invention is about twice as great as in known capacitors. After the development of the semiconductive grain-boundary barrier layers, a metal or a metal alloy, for instance a lead-tin alloy, is injected under vacuum into the hollow spaces 22 shown in FIG. 2. The resultant metal layers 2 are combined in pairs by metal connecting layers 3 to form the two plates of the monolithic capacitor. The use of non-noble metals or metal alloys in place of the nobel metals which were previously required because of the high sintering temperatures, such as platinum, palladium, gold or their alloys, which, as is known, diffuse into the grain-boundary barrier layers and in the extreme case destroy the insulation of the transition zones, gives monolithic capacitors of high capacitance per unit of volume which can be manufactured at low cost in mass production.

We claim:

1. A monolithic capacitor comprising an insulation body of a densely sintered dielectric ceramic material having electrically conductive layers interleaved parallel to and spaced from each other, which layers are formed in hollow spaces provided in layer regions in the dielectric material into which electrically conductive material is incorporated, which layers extend alternately up to one of two opposite outer surfaces of the insulating body where they are electrically combined by connections each forming one of the two plates of the capacitor, and the edge of which opposite outer surface extends spaced in each case from the opposite outer surface of the ceramic body, the electricly conductive layers being layers interposed in the dielectric material and of a porous ceramic material having a network of interconnected pores within which the conductive material is located, the ceramic material of the insulting body being a known semiconductor ceramic having a base of strontium titanate with intergrain insulation.

2. A capacitor according to claim 1, characterized by the fact that the strontium titanate is doped with at least one of niobium oxide, tantalum oxide and bismuth oxide, and contains at least one mineralizer or grain growth inhibitor for the impeding of the grain growth of the doped strontium titanate in such a manner that the grain size of the doped strontium titanate is between 5 $\mu$m and 10 $\mu$m.

3. A capacitor according to claim 2, characterized by the fact that the mineralizer or graingrowth inhibitor is the elements zirconium, vanadium, chromium, phosphorus, silicon, germanium, aluminum, niobium, bismuth, molybdenum, tungsten, iron, copper, nickel, individually or in combination.

4. A capacitor according to claims 1 or 2, characterized by the fact that the material of the insulating body and the material of the layers interposed between the dielectric have the same chemical composition.

5. A capacitor according to claims 1 or 2, characterized by the fact that the conductive material in the network connected with pores is a metal or a metal alloy.

6. A capacitor according to claim 5 in which the conductive material is a tin-lead alloy.

7. A method of manufacturing a monolithic capacitor according to claim 1 when opposite outer faces are electrically combined by connections each forming one of the two plates of the capacitor, characterized by the fact that a plurality of thin, self-supporting sheets of finely divided ceramic material which is bonded by a volatile binder and is densely sintered upon firing at sintering temperature is formed, that onto the self-supporting sheets there are applied layers of a second ceramic material which is bonded by a volatile binder and upon firing develops a network of intercommunicating pores, these layers being so arranged that they extend alternately to one and the other outer surface of the self-supporting sheets and terminate spaced from the other outer surface, that a body consisting of a stack of alternating self-supporting body, heated and brought to sintering temperature, is fired in an oxidizing atmosphere so that a network of inter-communicating pores is produced, that a firing is carried out in a reducing atmosphere for the complete reduction of the insulating body, that an aqueous solution of glass formers which act as a p-doping agent is injected into the open-pore network under vacuum and that the resulting insulating body is after-fired while maintaining a temperature profile in an oxidizing atmosphere in order to produce the inter-grain insulation.

8. A method according to claim 7, characterized by the fact that electrically conductive material is injected in vacuum under molten condition into the open-pore network.

9. A method according to claim 8, characterized by the fact that the electrically conductive material is a non-noble metal or metal alloy.

10. A method according to claim 9, characterized by the fact that the electrically conductive material is a tin-lead alloy.

11. A method according to claim 8, characterized by the fact that the glass former is at least one member of the group consisting of bismuth oxide, lead boron oxide, bismuth lead boron oxide and the oxides of the transition metals copper, manganese, iron, nickel and cobalt.

* * * * *